United States Patent
Shiga

[19]
[11] Patent Number: 6,145,093
[45] Date of Patent: Nov. 7, 2000

[54] DEBUGGING METHOD AND METHOD OF DISPLAYING INFORMATION FOR DATA PROCESSING FOR USE IN PROGRAMMABLE DISPLAY DEVICE

[75] Inventor: Yoji Shiga, Sakai, Japan

[73] Assignee: Digital Electronics Corporation, Osaka, Japan

[21] Appl. No.: 09/100,965

[22] Filed: Jun. 22, 1998

[30] Foreign Application Priority Data

Jun. 25, 1997 [JP] Japan ..................................... 9-184506
Jun. 25, 1997 [JP] Japan ..................................... 9-184507

[51] Int. Cl.[7] ................................................. G06F 11/00
[52] U.S. Cl. ............................................ 714/9; 348/845.1
[58] Field of Search .................................... 714/9, 2, 3, 5, 714/20, 21, 25, 27, 30, 31, 37, 39, 48, 742, 745, 764; 395/175, 328, 800; 348/845.1, 15, 607, 616

[56] References Cited

U.S. PATENT DOCUMENTS

| | | | |
|---|---|---|---|
| 4,955,024 | 9/1990 | Pfeiffer et al. .......................... | 371/40.1 |
| 5,185,599 | 2/1993 | Doornink et al. ....................... | 340/747 |
| 5,727,141 | 3/1998 | Hoedie et al. ........................... | 395/175 |
| 5,798,948 | 8/1998 | Rashkovskiy et al. ................. | 364/572 |
| 5,910,827 | 6/1999 | Kwan et al. ............................ | 348/845.1 |

FOREIGN PATENT DOCUMENTS

| | | |
|---|---|---|
| 3-196202 | 8/1991 | Japan . |
| 3-196203 | 8/1991 | Japan . |

*Primary Examiner*—Nadeem Iqbal
*Attorney, Agent, or Firm*—Arent Fox Kintner Plotkin & Kahn

[57] ABSTRACT

To utilize a general-purpose personal computer 6 for debugging data easily in a programmable display device 10 wherein sets of processing instruction words are used on-screen for data processing, means of generalized construction is used for data communications between the computer 6 and the display device 10, and device names to be referred to in the reference information included in the instruction words are transferred, as converted to universal codes, between the computer 6 and the display device 10. The information to be displayed in serial frames 52 as branched for data processing is grouped into layers according to predetermined criteria so as to enable the operator to readily recognize the position of the current frame of information. When the movement of the information is selected, the information is moved on-screen from one layer to another layer.

5 Claims, 10 Drawing Sheets

DEBUGGING METHOD AND METHOD OF DISPLAYING INFORMATION FOR DATA PROCESSING FOR USE IN PROGRAMMABLE DISPLAY DEVICE

FIELD OF THE INVENTION

The present invention relates to a method of debugging data stored in programmable display devices and a method of displaying and altering or changing information for data processing while selecting required processing for use in the display device, such display devices being adapted to display information in the form of graphics, graphs, mathematics or characters for operating an external device or to prepare graphics or drawings, in a desired coordinate position on the screen of a display, based on data transferred between the display device and the external device which is, for example, a general-purpose computer or programmable logic controller (hereinafter referred to as "PLC").

BACKGROUND OF THE INVENTION

Conventionally, the programmable display device of the type mentioned is debugged generally by checking the eventual operation of the device as connected to the PLC to be used actually. On the other hand, it is also proposed to debug the display device by simulating functions of the PLC on a general-purpose personal computer without actually connecting the device to the PLC.

However, for the simulation of PLC functions on a personal computer, it is necessary to simulate all the functions of the PLC including its data communication function and ladder program for communication which are provided according to the specifications peculiar to the particular PLC. Moreover, PLCs are not universal in functions; those of different types have different functions even if provided by the same manufacturer. Thus difficulties are encountered in developing debugging systems per se.

Further such programmable display devices are generally so designed as to display the main menu on start-up, such that procedures presented on the main menu are thereafter selected one after another to perform the tasks required by the device and to process all the data needed by the operator.

The processing screen is often provided with a switch for a return to the preceding screen of information and a switch for proceeding to the next screen of information so that the current on-screen information can be moved one frame forward or reversely. Further another switch may be provided for a direct return to the main menu.

In recent years, however, on-screen information becomes complex, and many frames of on-screen information for data processing need to be implemented or passed before completely performing all the required data processing operations. Consequently, even if the on-screen information can be merely scrolled forward or reversely, the user is unable to recognize the position of the current screen of information in the entire quantity of on-screen information for processing, and also encounters difficulty in reaching the screen information required. Since the programmable display device of the type described is generally used at a site of work as in a plant, it is not infrequently required to urgently move the on-screen information to the position of the required frame.

To meet such requirement, it is possible to prepare pull-down or tabulated menus so as to enable the operator to recognize the overall relationship. Such forms of menus are useful for processing data in parallel manner, whereas if it is attempted to use menus in selecting different on-screen processing procedures in series according to options, many problems still remain to be overcome. For example, the on-screen information itself or the program becomes complex.

SUMMARY OF THE INVENTION

The present inventor has made investigations into the foregoing problems relating to debugging to find that while PLCs differ in specifications from type to type mainly with respect to data communications, the device of the type required can be mechanically substituted in the final stage of debugging, and that it is the procedures to be performed directly by the operator, such as specifying addresses on the PLC side, that require substantially frequent debugging.

The debugging method of the invention has been accomplished based on these findings. An object of the invention is to provide a method of easily debugging various items of data stored in a programmable display device by simulating functions of a PLC through generalization of data communication function and utilizing a general-purpose personal computer.

As generally shown in FIGS. 1($a$) and ($b$) schematically, the present invention provides a method of debugging a programmable display device 10 which comprises data communication means 3 connected to a specified external device 1 by a communication channel 18 and adapted to transfer data to or from memory means 2 of the external device 1 through the communication channel 18, event data memory means 4 for storing sets of processing instruction words each set of which includes information specifying the contents of a unit operation to be processed, and data display means 5 for successively decoding the sets of process instruction words stored in the event data memory means 4 and giving on a display screen 14 a presentation corresponding to information referred to by each set of processing instruction words.

The debugging method is characterized by simulating functions of the external device 1 other than the data communication function thereof with the simulating means 7 with use of a general-purpose personal computer 6, and simulating the function amenable to data communications with a general-purpose communication means 9 of the personal computer 6 with use of data communication means 3$a$ of the programmable display device 10$a$, the personal computer 6 and the display device 10$a$ having respective means 8, 8$a$ enabling conversion of device names dependent on the device type, predetermined by the external device 1, and referred to by the process instruction words to and from generalized code data, whereby the personal computer 6 is made accessible by the programmable display device 10$a$ having stored therein process instruction words dependent on the specified device type by means of the general-purpose communication means 3$a$, 9.

The external device 1 comprises a PLC 16 shown in FIG. 3 as an example. Preferably, the general-purpose communication means 3$a$ included in the programmable display device 10$a$ is mechanically replaced upon completion of debugging by means in conformity with a protocol which is dependent on the type of the PLC 16 to be connected.

The debugging method of the invention is adapted to simulate the functions of the external device 1 except the communication function which is dependent largely on the hardware of the type adopted, whereby the functions to be simulated are simplified to the greatest possible extent, ensuring a facilitated debugging operation with use of the general-purpose personal computer 6.

The present inventor has also conducted studies on the problems relating to displaying frames of information for data processing and consequently found that the information to be presented on the display device of the type described for data processing, i.e., the main frame and the subsequent frames of information to be presented until the desired frame is displayed, can be grouped into layers stepwise in corresponding relation with the contents of processing, and that all the foregoing problems can be solved by making it possible to move the information between layers in addition to, or in place of, the usual mode of moving the information on-screen.

The method of the invention for displaying information for data processing has been accomplished based on the above finding. Thus, another object of the invention is to provide a method of displaying information for data processing wherein the information to be displayed in serial frames as branched for data processing is grouped into layers according to predetermined criteria so that the information is moved on-screen from one layer to another layer, thereby enabling the operator to readily recognize the position of the current frame of information in the series of frames for data processing and to perform a desired data processing operation rapidly and properly.

FIG. 6 schematically shows a hierarchical arrangement of frames of information 51 for use in practicing the displaying method of the invention, such that starting with a first frame 51a, information is changed on-screen from frame to frame in series branchwise as selected by the operator.

The displaying method of the invention is characterized in that the series of frames of information to be displayed in succession are grouped into layers with the first frame 51a positioned as a first layer, while making it possible to move a desired frame 51b of information included in the series of frames and currently belonging to one of the layers to a frame in another one of the layers by a single selection procedure.

The information is in the form of plurality of sets of frames having at least one frame in common, and the frames of information in each set can be grouped into layers, with the frame in common being classified in the same layer for the plurality of sets.

The frames of information are grouped into layers which increase by an increment of one layer for every instance of branching, and for a return from the above-mentioned desired frame, the information can be returned on-screen to the last frame in said another one layer.

According to the method of the invention for displaying information for data processing, the information to be displayed in serial frames 51 as branched for data processing is grouped into layers, and made movable on-screen from one layer to another layer, thereby enabling the operator to readily recognize the position of the current frame of information in the series of frames 51 for data processing and to perform a desired data processing operation rapidly and properly.

DETAILED DESCRIPTION OF EMBODIMENTS

Construction of Programmable Display Device

Figure 1:
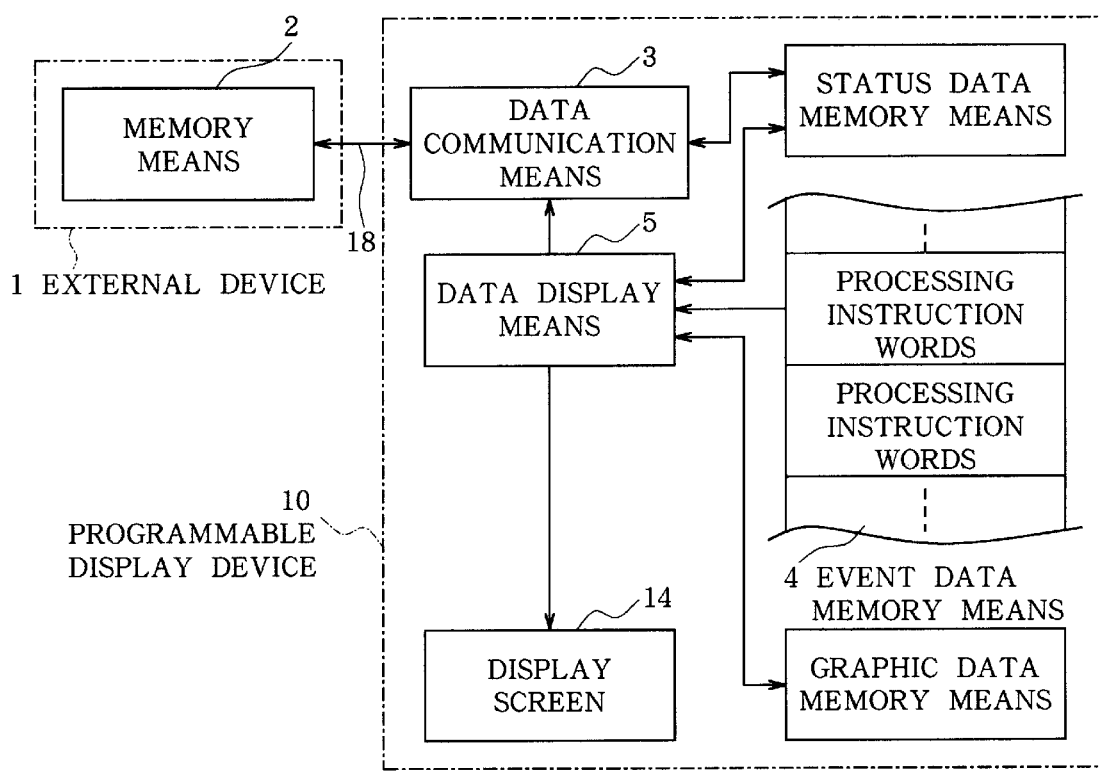
FIG. 1(a) is a block diagram showing a programmable display device as connected to an external device in condition for operation.
FIG. 1(b) is a block diagram showing a programmable display device as connected to a debugging device during debugging.
Figure 1:
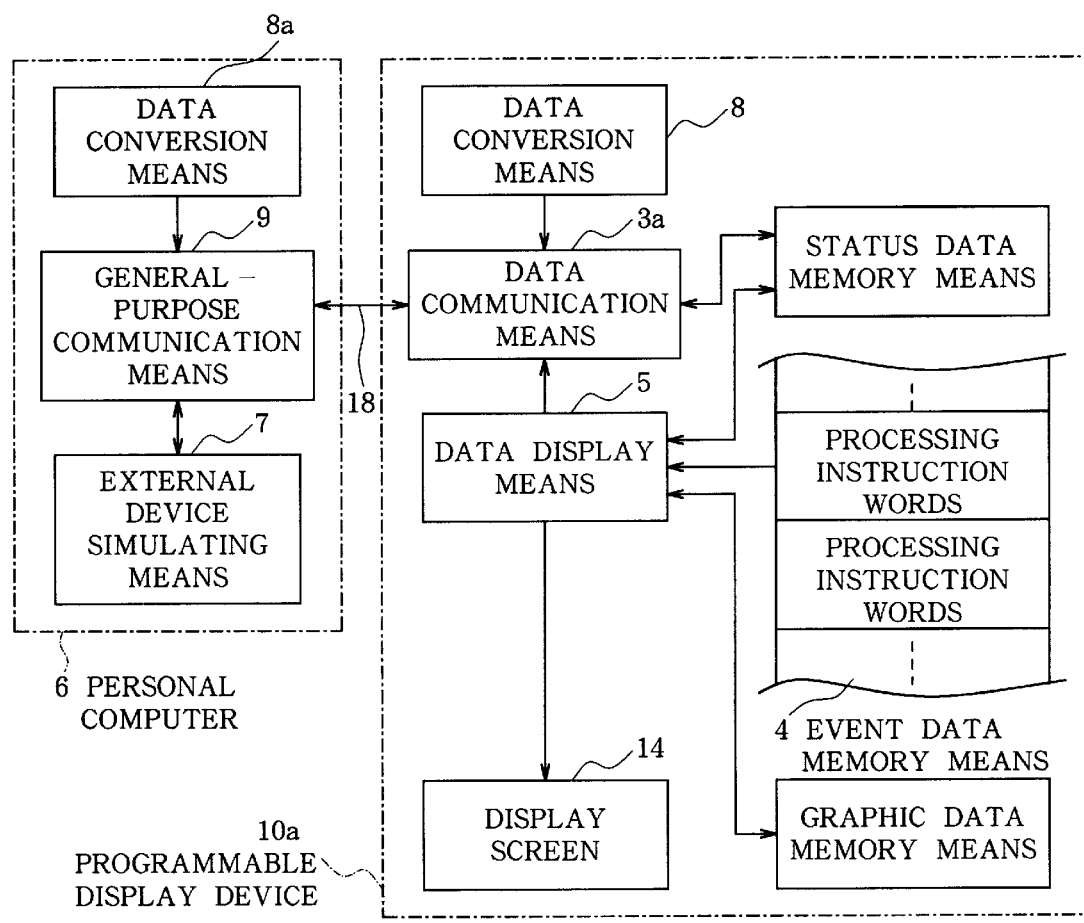
Figure 2:
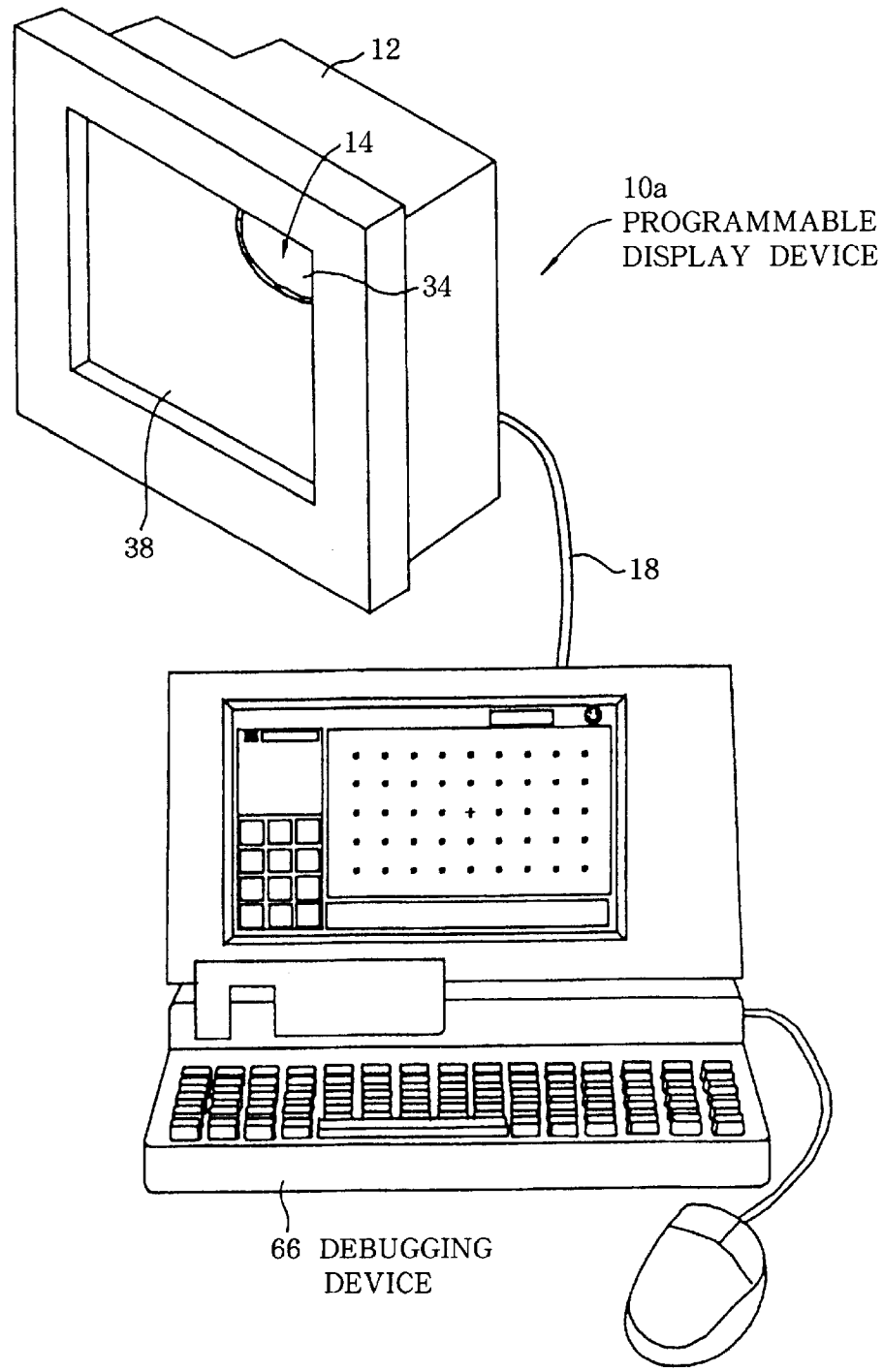
FIG. 2 is a perspective view partly broken away and showing the appearance of the display device and the debugging device for practicing the invention.

With reference to FIG. 2, a programmable display device 10 for which the present invention is to be practiced is small-sized and has a body case 12 of minimized volume and a display 34 exposed at its front side and including a display screen 14 of minimized size. When to be used, the device 10 is connected directly to a specified PLC 16 by a communication channel 18 to transfer required data to and from the PLC 16.

Figure 3:
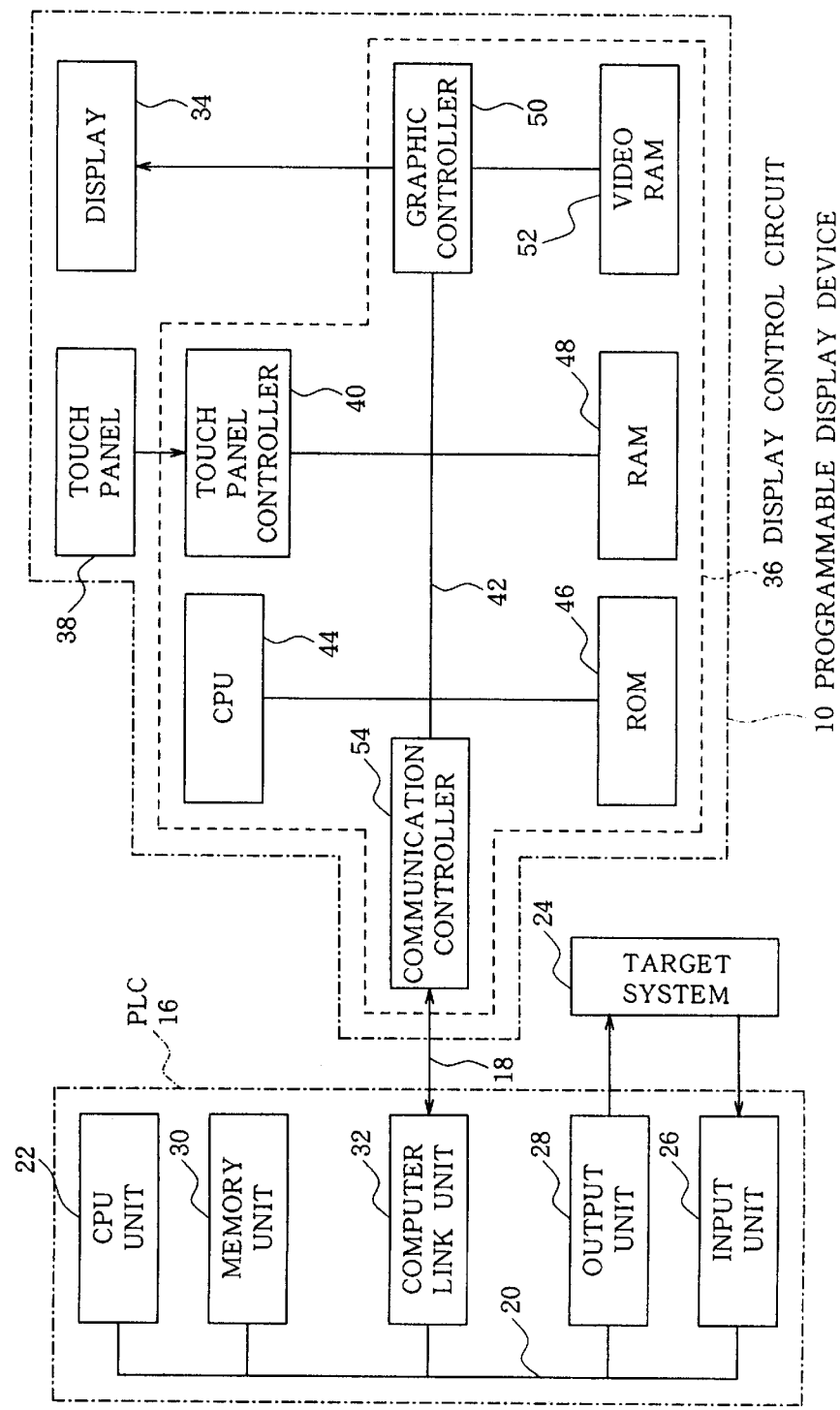
FIG. 3 is a block diagram showing an example of electrical construction of a programmable display device and a PLC.

The PLC 16 to be accessed as an external device by the display device 10 comprises circuits provided as units for the individual functions required, for example, as shown in FIG. 3, and such units are connected in parallel by a bus line 20 so as to be variable in the number of units as required. Thus the PLC 16 generally has a variable number of functions in its entirety. The PLC to be used is not limited in type or construction.

The PLC 16 shown as an example consists essentially of a CPU unit 22, an input unit 26 permitting direct acceptance of detection signals from a target system 24, an output unit 28 for delivering specified control signals to the target system 24, a memory unit 30 for storing various items of data, and a computer link unit 32 enabling specified data communication between the PLC and the display unit 10.

The memory unit 30 provides locations for storing various items of data to be input to or output from the target system 24, for respective passive parts such as level gauges or limit switches, or for respective active parts such as relays or motors mounted on the target system 24 which is to be controlled or for which data is to be displayed. A word device is specified for the word data, such as numerical values, to be input or output, and a bit device for bit data, such as on-off data, each of the devices being designated by a device name, such as "D100," peculiar to the device type. Thus, the memory unit 30 has stored therein data the location of which can be specified by specifying a particular device name.

When the desired word device or bit device in the memory unit 30 is accessed merely by specifying the corresponding device name from inside or outside of the PLC 16, it is therefore possible to individually retrieve the data for controlling the corresponding portion of the target system 24 or the data relating to the operating state thereof without recognizing the actual address in the PLC 16.

The programmable display device 10 is incorporated, for example, into an operating table for the target system 24 along with the PLC 16, or is provided independently, for use as data input and display means for the target system 24.

Stated more specifically, the display 34 is selected from CRT, EL, plasma, liquid crystal or other display means and so provided as to close a large opening in the center of front side of the body case 12 as seen in FIG. 2.

The body case 12 houses a display control circuit 36 shown in FIG. 3, while the screen 14 of the display 34 is covered with a transparent touch panel 38 in intimate contact with its front surface. Instructions are given by pressing the touch panel 38 and then accepted and analyzed by a touch panel controller 40. Thus, the panel 38 can be manually acted on for initialization before starting up the overall system for testing, and for giving instructions during operation.

The display control circuit 36 generally has the same basic construction as in common personal computers. A CPU 44, ROM 46, RAM 48 and graphic controller 50 are connected by bus lines 42, and the CPU 44 performs predetermined data processing operations according to a system program stored in the ROM 46, while the results of arithmetic computations and other operations suitably stored in the RAM 48 are fed to a video RAM 52 via a graphic controller 50 using graphic preparation data including the processing instruction words to be described later in detail. Presentations corresponding to the data written to the video RAM 52 are made on the display 34.

The display control circuit 36 further has stored therein a communication program in conformity with a communications protocol in match with that provided for the computer link unit 32 of the PLC 16, whereby data can be transmitted to and received from the link unit 32 of the PLC 16 at a high speed via a communication controller 54 and communication channel 18.

Figure 4:
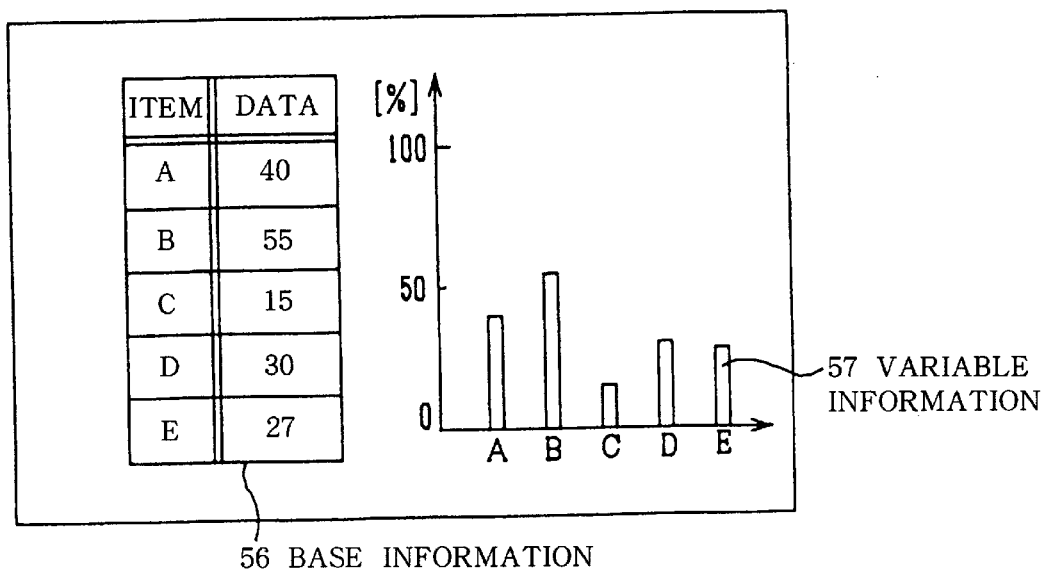
FIG. 4(a) is a diagram showing graphic data as an example of graphic preparation data.
FIG. 4(b) is a diagram showing processing instruction words exemplifying graphic preparation data.
Figure 4:
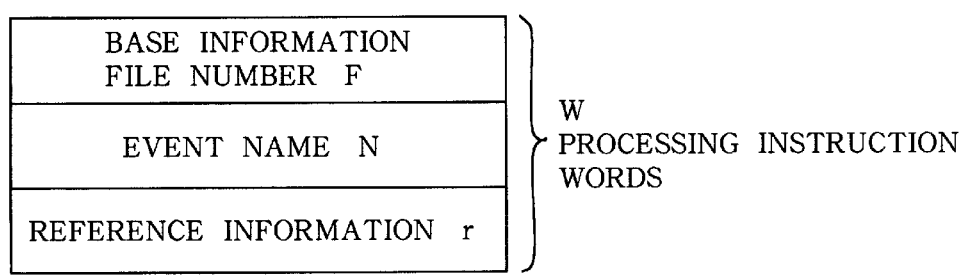

The programmable display device 10 has prepared therein on-screen base information 56 which need not be altered in contents, such as tables and frames of graphs as exemplified in FIG. 4(a), or graphic data such as graphics to be caused to flash on and off or to undergo color changes on the base information 56, the information 56 or graphic data being designated by file numbers for respective display units required.

Of the data represented by the bit or word devices provided in the memory unit 30 of the PLC 16, required items of data are delivered, as associated with one another, from the PLC 16 to the RAM 48 of the display device 10 by the communication channel 18 at suitable timing. On the other hand, sets of processing instruction words W stored in the ROM 46 in advance, such as those shown in FIG. 4(b), are intermittently read out at a very small time interval, and the operation specified by the event name N included in the set of instruction words W available each time is performed with reference to the data delivered from the PLC 16 and as specified by a particular device name from reference information r. In this way, variable information 57, such as numerial value of graph, is displayed which varies in conformity with the alteration of content of the bit or word device in the PLC 16.

Debugging Method

The present invention provides as another feature thereof a method of eventually debugging mainly the device names as prescribed in the processing instruction words W for use in the programmable display device 10 described above.

Figure 5:
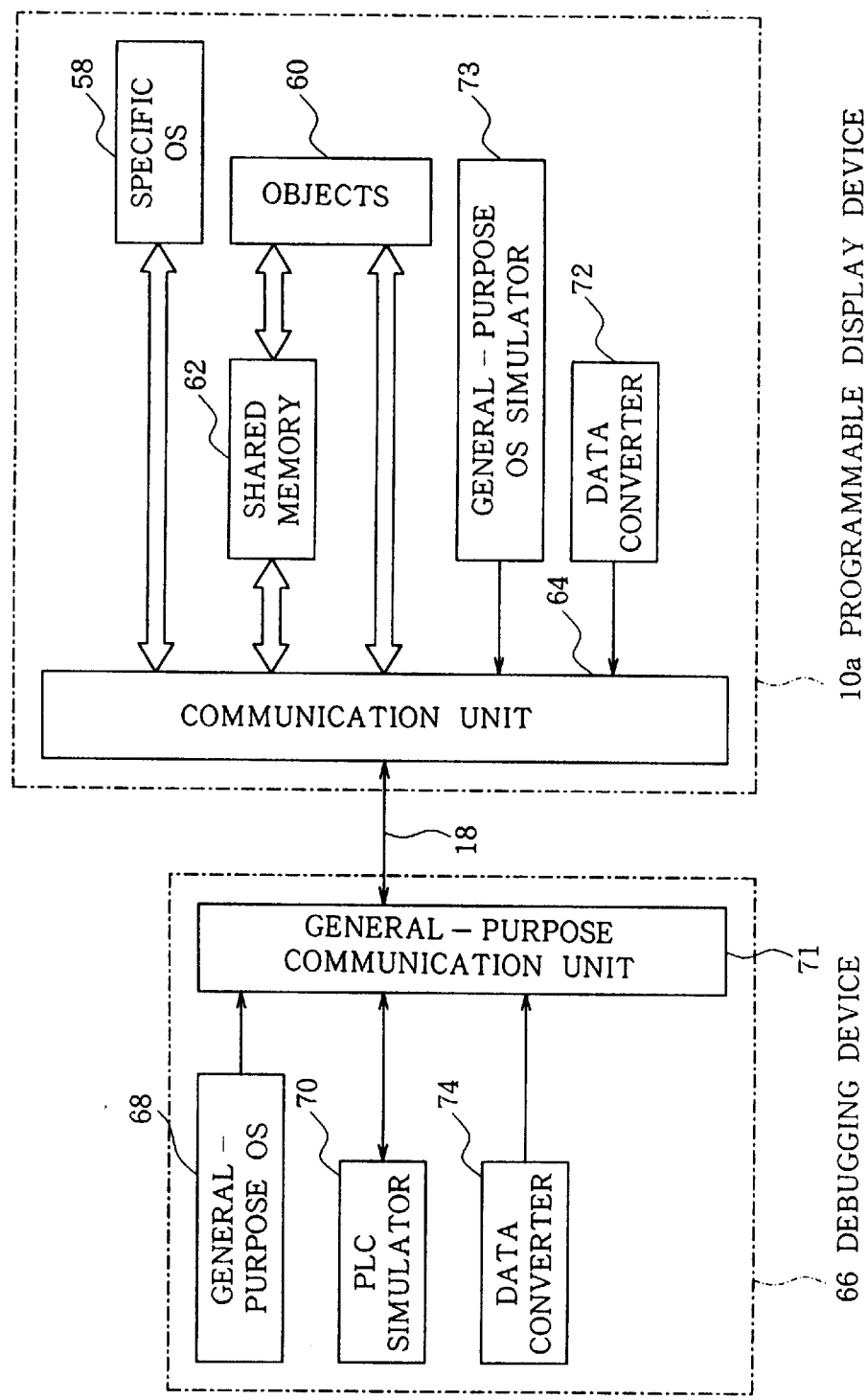
FIG. 5 is a block diagram showing an exemplary arrangement of programmable display device and debugging device connected thereto during debugging.

With reference to FIG. 5, a programmable display device 10a provided with various items of data which have not been debugged includes an OS 58 specifically designed for built-in devices as a central system for controlling the overall device, and further comprises various objects 60 operable on the OS 58, a shared memory 62, etc. which are connected via an interface to a communication unit 64 in the manner of hardware or software for the transfer of required data between the unit 64 and these components.

A general-purpose personal computer equipped with a general-purpose OS 68 is utilized as the debugging device 66 for practicing the present invention, such that functions of the PLC 16 to be actually connected to the display device 10 to be debugged are simulated on the OS 68 by a PLC simulator 70 according to program exclusive of a communication unit 71.

On the other hand, the communication unit 64 of the display unit 10a simulates a communications protocol required for an OS simulator 73 which is universal to general-purpose personal computers, and is thereby adapted for data communications with the communication unit 71 of the debugging device 66.

The programmable display device 10a further has a data converter 72, for example, of the database type for converting specific device names set in a plurality of PLCs to be associated with the device 10a into universal code numbers, so that the device names dependent on the type of the device and incorporated as the reference information r into the processing instruction words W in the display device 10a are converted into universal code numbers which correspond to the respective device names but which are not dependent on the particular device type, before the device names are transferred to the debugging device 66.

The debugging device 66 also has a data converter 74 having approximately the same function as the converter 72 of the display device 10a, such that the code number received via a communication channel 18 is converted to the corresponding device name specified by the PLC 16 which is simulated by the debugging device 66. Data is then written to or retrieved from the memory specified by the device name for the transfer of the required data between the device 66 and the display device 10a.

If a device name which does no exist or a wrong device name is specified as the device name in the instruction words W stored in the display device 10a, a fault appears on the presentation given on the display 34 of the device 10 in the case of retrieved data.

Conversely if the device name in the written data is in error, a device not existing is accessed by the debugging device 66, or a device different from the device specified by the display device 10a is accessed, whereby the error in the device name is detected.

Thus, the portions of the device 10a and the debugging device 66 serving to transfer data therebetween, including the data itself to be transferred, have nothing dependent on the particular device type but are usable in common. Accordingly, in simulating functions of the PLC 16 by the debugging device 66, there is no need to simulate the ladder program for data communications, but only the substantial functions to be performed by the PLC 16 need to be simulated.

The communication unit 64 as included in the display device 10a before the completion of debugging is automatically replaced by one specific to the device type upon completion of debugging by a mechanical procedure substantially in the same manner as in the prior art.

Although a general-purpose personal computer is adapted for use specifically as the debugging device 66 according to the embodiment described, this example is not limitative.

The device can of course be provided with all functions for generally developing various items of data for the programmable display device, such as the function of preparing on-screen data for the programmable display device and function of preparing communication programs.

Method of Displaying Information

Described next is a method of the invention for displaying menus on-screen, as adapted for use in a programmable display device, with a PLC connected thereto which is specifically designed for the sequence control of the target system so as to make it possible to display information and effect control for the status data to be handled by the PLC and to prepare programs therefor. However, the application of the method is not limited to this example; the method is of course similarly usable also for general-purpose personal computers and like other devices having the function of selectively giving on-screen information regardless of whether the device is adapted for general use or specific use.

Figure 7:
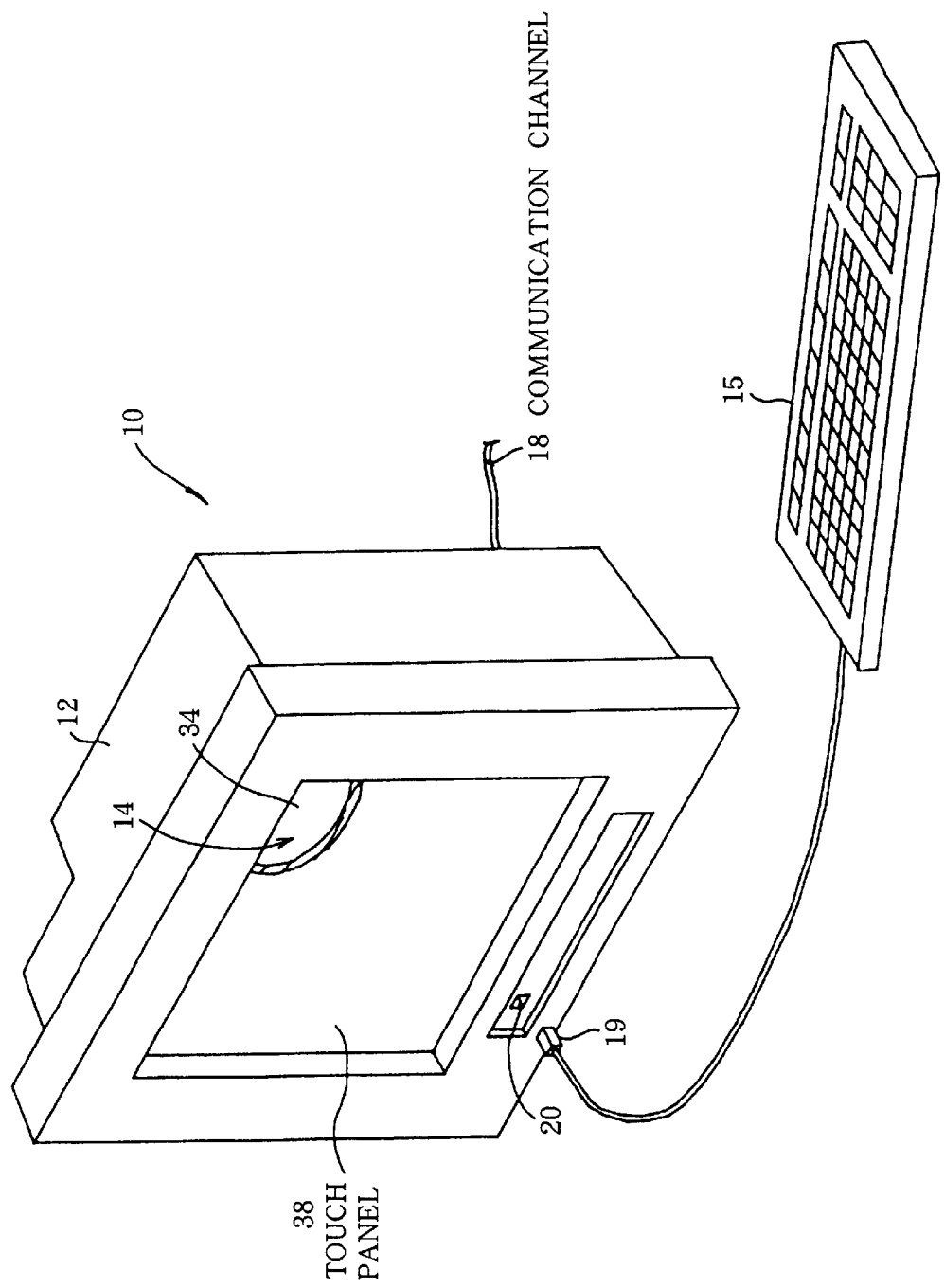
FIG. 7 is a perspective view partly broken away and showing a programmable display device for practicing the invention.
Figure 8:
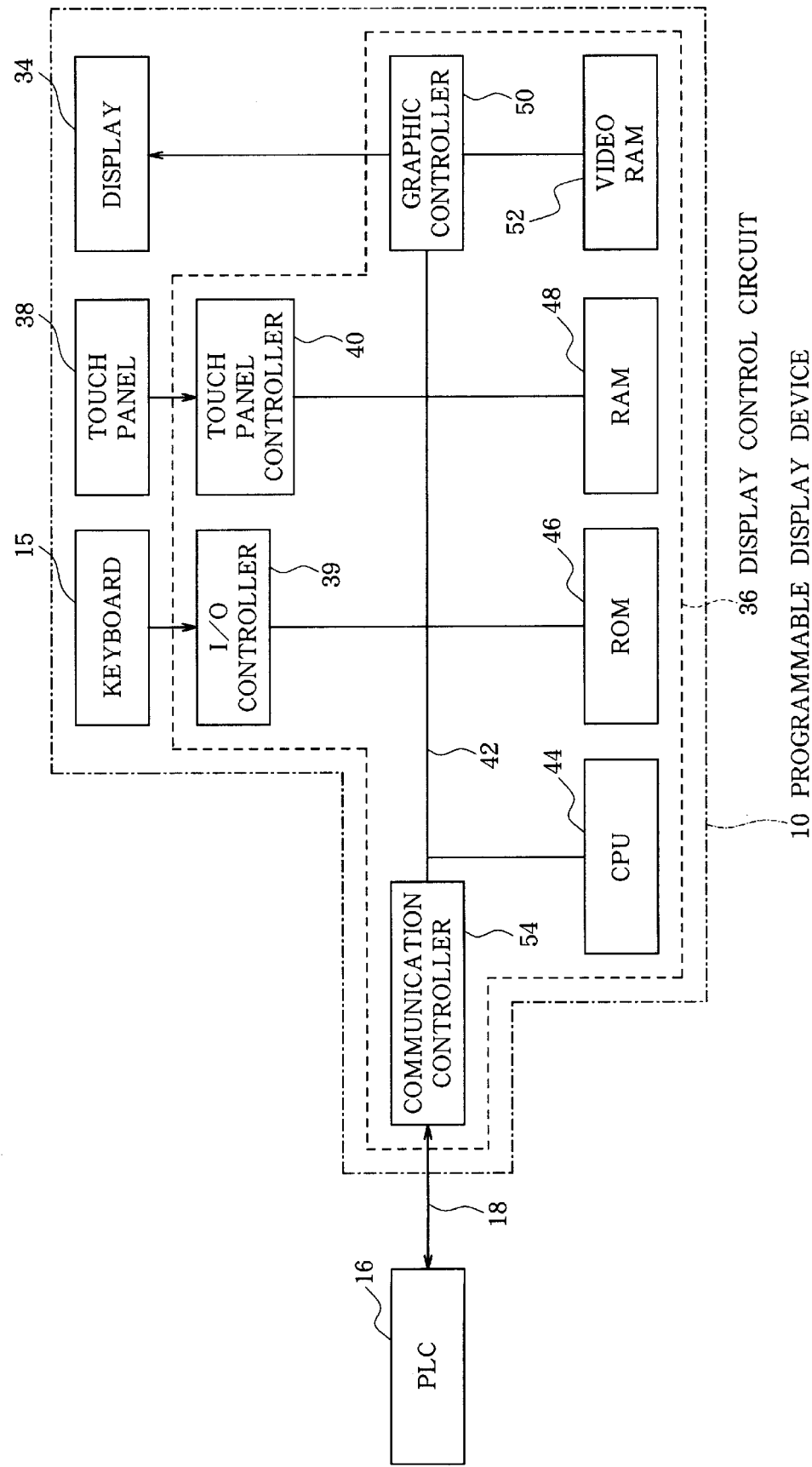
FIG. 8 is a block diagram of an example of electric circuit for use in the invention for controlling a PLC and displaying.

As shown in FIGS. 7 and 8, the programmable display device 10 for practicing the invention is incorporated, for example, into an operating table for the target system along with a PLC 16, or is provided independently, for use in preparing, handling and displaying various items of data for the target system.

The interior of the PLC 16 provides locations for storing status data directly input to or output from the target system in advance or to be used for controlling the system, for respective passive parts such as level gauges or limit switches, for respective active parts such as relays or motors, or for respective data setting parts such as counters or printer mounted on the target system which is to be controlled or for which data is to be displayed. A word device is specified for the word data, such as numerical values, to be input or output, and a bit device for bit data, such as on-off data. The storage location of particular data can be specified by specifying the name of the corresponding device.

Accordingly, when the desired word device or bit device is accessed merely by specifying the corresponding device name from inside or outside of the PLC 16, it is possible to individually retrieve the data for controlling the corresponding portion of the target system or the data relating to the operating state thereof.

As shown in FIG. 7, the programmable display device 10 has a display 34 which is so provided as to close a large opening in the center of front wall of a body case 12. A socket 20 is disposed on the front wall below the screen 14 of the display for removably inserting therein a plug 19 for a keyboard 15.

The body case 12 houses a display control circuit 36 shown in FIG. 8, while the screen of the display 34 is covered with a transparent touch panel 38 in intimate contact with its front surface. Instructions are given by pressing the touch panel 38 and then checked for the input position thereof by a touch panel controller 40. Thus, the panel 38 can be manually acted on for inputting data during the operation of the overall system.

The display control circuit 36 generally has the same basic construction as in common personal computers. A CPU 44, memories such as ROM 46 and RAM 48, and graphic controller 50 are connected by bus lines 42. The CPU 44 performs predetermined computations or operations according to a system program stored in the ROM 46, while characters can be input from the keyboard 15 via an I/O controller 39. The results of computations or operations suitably stored in a work memory within the RAM 48 are fed to a video RAM 52 by the graphic controller 50 using image data stored in a graphics memory in advance. Presentations corresponding to the data written to the video RAM 52 are made on the screen of the display 34.

Furthermore, data can be transferred between the display device 10 and the PLC 16 through a parallel or serial communication channel 18 via a communication controller 54 which is operable according to an algorithm specific to the circuit construction of the PLC 16 described or a general-purpose communications program.

Figure 9:
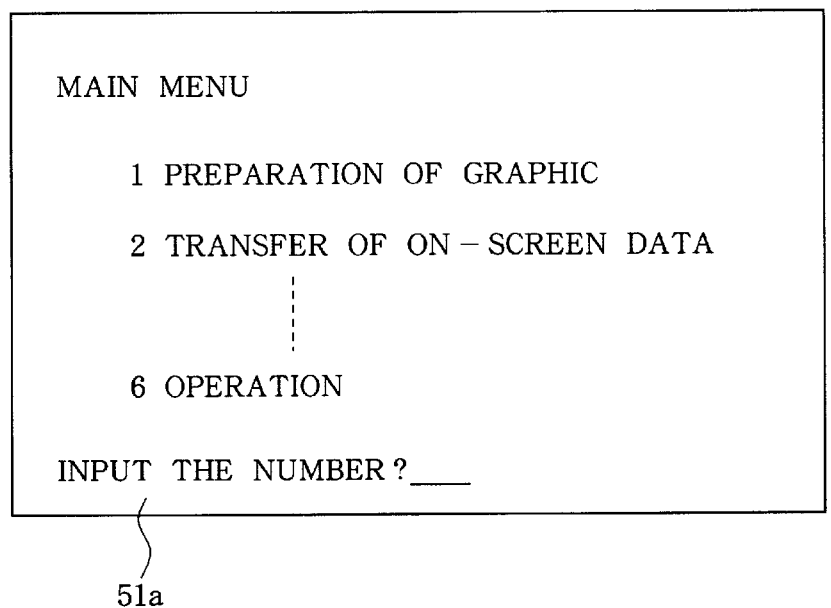
FIG. 9(a) is a diagram showing a frame of information in a first layer.
FIG. 9(b) is a diagram showing a frame of information in a layer other than the first.
Figure 9:
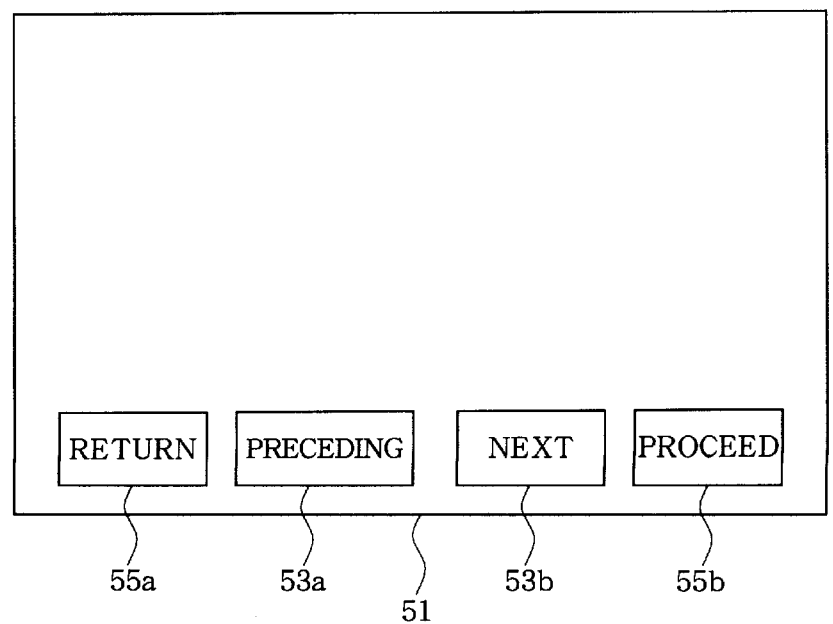

When the programmable display device 10 is started up, the main menu 51a shown in FIGS. 9(a), (b) is displayed first, permitting the operator to select, for example, preparation of graphic, initialization or operation as a display device from among the options available.

When "PREPARATION OF GRAPHIC" on the main menu 51a is selected in the case of the display device 10 for practicing the invention, a graphic function is activated, presenting on-screen base information 56 as shown in FIG. 4(a) and comprising only a platelike image which need not be altered in contents, or enabling preparation of image data as to a graphic to be caused to flash on and off or to undergo color changes on the base information 56. Upon completion of graphic preparation, file numbers are specified for respective display units required, followed by storage in the graphic memory.

Of the status data set in the PLC 16 and represented by bit devices, such as one corresponding to the on-off state of a relay, or by word devices such as one corresponding to a variation in temperature, required items of data are fed, as associated with one another, to a status data memory on the RAM 48 of the display device at suitable timing.

When the preparation of graphic has been executed, the system requires that processing instruction words to be described below be presented on the screen area of base information 56. An event data memory is provided which is adapted to store sets of processing instruction words corresponding in number to the number of events to be implemented on the screen area of base information 56.

With reference to FIG. 4(b), each set of processing instruction words includes in combination a base information file number F for which display control is to be effected, an event name N for specifying the contents of operation to be implemented on the information area 56, and reference information r comprising an item or items of data to be referred to for every effective event. Required information, such as the address of the data to be referred to or the coordinates of presentation to be made on the screen of the display 34, can be included in the reference information r.

Accordingly, when "OPERATION" is selected on the main menu 51a, sets of processing instruction words W are intermittently read out at a very small time interval, and the operation specified by the event name N included in the set of instruction words W available each time is performed with reference to the status data delivered from the PLC 16 to the status data memory and the reference information r included in the instruction words W, whereby the data to be displayed is prepared which varies in response to the alteration of content of the bit or word device in the PLC 16. Thus, information corresponding to the state of the PLC 16 as controlled is displayed on the specified screen area of base information 56.

Figure 6:
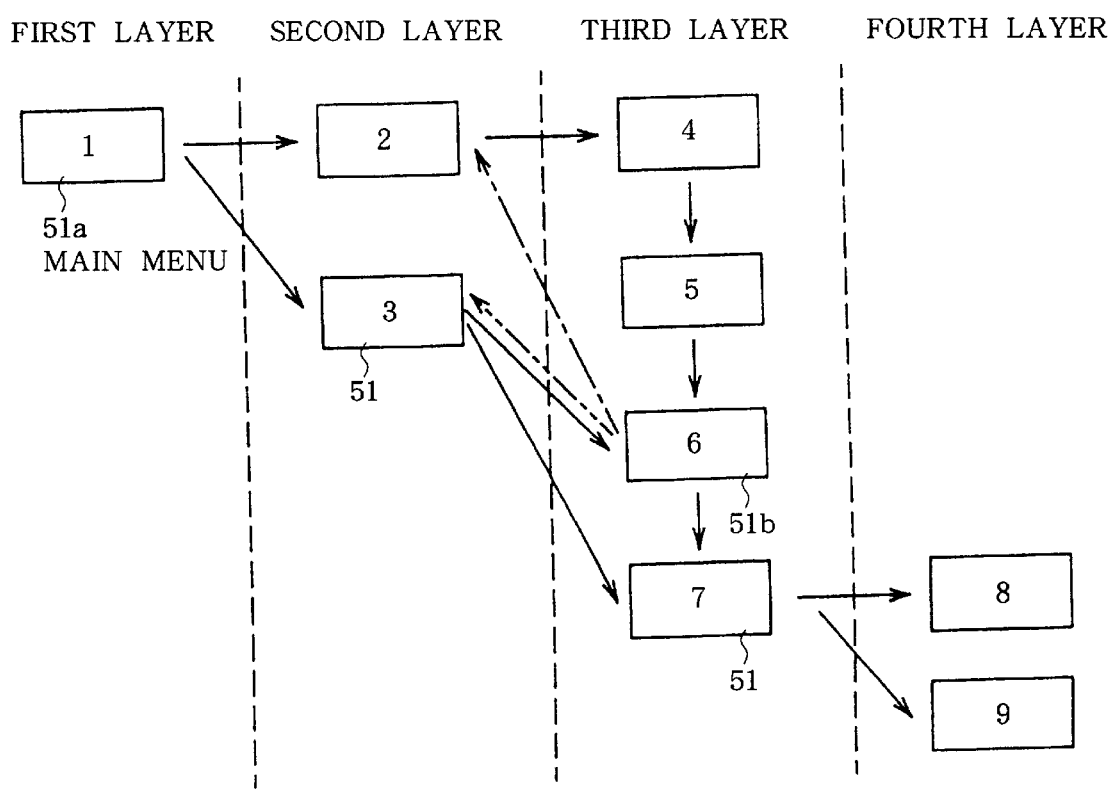
FIG. 6 is a diagram for illustrating hierarchical arrangement of frames of information for data processing.

The method of the invention described is characterized in that as seen in FIG. 6, the information to be displayed in serial frames 51 is branched in the form of a tree, starting with the main menu 51a described, and grouped into layers according to predetermined criteria for selective presentation, the information being movable from layer to layer.

The screens or frames 51 of information for data processing are classified into those for use in selecting one procedure from among a plurality of options as is the case with the main menu 51a, those for use in setting data, for example, for preparing graphics or for initialization, and those displaying data in a predetermined format as for presenting data during operation. Further some frames of information 51 are designed for use in common in different flows of data processing.

Accordingly, with the main menu 51a positioned as the first layer, the frames of information are grouped into layers which increase by an increment of one layer for every instance of branching. Furthermore, frames of information which are likely to be used in common are, as a rule, classified into one layer. Even in the case where the same frame is reached via different routes, the hierarchical arrangement is so designed that the sequence proceeds through the same layer, or from frame to frame with an increase in the number of layers. As a rule, a plurality of screens or frames which need to be implemented collectively are grouped as one layer.

In this way, all the frames of information 51 for data processing are assigned layer numbers straightforwardly, and are stored in the form of a table wherein file names of the frames are given in corresponding relation with the layer numbers. With respect to the frames 51 actually selected from the main menu 51a, each frame has its file name additionally stored every time the sequence proceeds one frame.

On the other hand, each frame of information 51 is provided with switches 55a, 55b for selecting "RETURN" and "PROCEED" in addition to the conventional switches 53a, 53b for displaying the preceding frame of information (on-screen info.) and the next frame of information (on-screen info.). Accordingly, if the switch 53a or 53b for the preceding or next frame is pressed, the on-screen information is moved one frame reversely or forward.

However, when the switch 55a of "RETURN" is pressed, the frame 51 currently displayed and belonging to a particular layer is returned to a frame in the layer immediately preceding this layer instead of restoring the frame immediately preceding the current frame.

With reference to FIG. 6, suppose the information is moved from the fifth frame to the sixth frame 51b, whereupon "RETURN" is selected. The sequence returns to the second frame in the second layer which is immediately above the third layer wherein the frame 51b is positioned as indicated in a chain line instead of returning to the fifth frame. However, when the information is moved to the sixth frame 51b as selected on the third frame, and when "RETURN" is subsequently selected, the sixth frame 51b returns to the third frame which is included in the same set of frames as the frame 51b and which is positioned in the second layer as indicated in a two-dot chain line.

Conversely, when the switch 55b for "PROCEED" is pressed on a frame of particular layer and if this layer includes a plurality of frames, the sequence proceeds to the last frame in this layer, whereas if the layer contains only one frame, the next frame will be displayed. In this way, frames classified as the same layer are handled as a group, omitting the contents to be implemented and followed by the subsequent processing step.

When the layer in which the frame to be restored is positioned includes a plurality of frames, the sequence can be so designed as to return to an optional frame predetermined. However, if the sequence is so determined that the last frame in each layer is to be restored, the layer wherein the frame currently being implemented is positioned can be implemented from the beginning.

The devices and methods of the present invention are not limited only to the foregoing embodiments but can be modified variously without departing from the spirit of the invention as set forth in the appended claims.

What is claimed is:

1. A method of debugging a programmable display device comprising:

data communication means connected to a specified external device by a communication channel and adapted to transfer data to or from memory means of the external device through the communication channel, event data memory means for storing sets of processing instruction words each set of which includes information specifying the contents of a unit operation to be processed, and data display means for successively decoding the sets of process instruction words stored in the event data memory means and giving on a display screen a presentation corresponding to information referred to by each set of processing instruction words, the debugging method being characterized by:

simulating functions of the external device other than the data communication function thereof with use of a general-purpose personal computer, and simulating the function amenable to data communications with the personal computer with use of data communication means of the programmable display device, the personal computer and the display device having respective means enabling conversion of device names dependent on the device type, predetermined by the external device, and referred to by the process instruction words to and from generalized code data, whereby the personal computer is made accessible by the programmable display device having stored therein process instruction words dependent on the specified device type by means of the general-purpose communication means.

2. A debugging method according to claim 1 wherein the external device is a programmable logic controller, and the general-purpose communication means included in the programmable display device is mechanically replaced upon completion of debugging by means in conformity with a protocol which is dependent on the type of the programmable logic controller to be connected.

3. A method of displaying information for data processing wherein starting with a first frame, the information is changed on-screen from frame to frame in series branchwise as selected by the operator, the displaying method being characterized in that:

the series of frames of information to be displayed in succession are grouped into layers with the first frame positioned as a first layer, while making it possible to move a desired frame of information included in the series of frames and currently belonging to one of the layers to a frame in another one of the layers by a single selection procedure.

4. A displaying method according to claim 3 wherein the information is in the form of plurality of sets of frames having at least one frame in common, and the frames of information in each set are grouped into layers, said at least one frame in common being classified in the same layer for the plurality of sets.

5. A displaying method according to claim 4 wherein the frames of information are grouped into layers which increase by an increment of one layer for every instance of branching, and for a return from said desired frame, the information is returned to the last frame in said another one layer.

* * * * *